United States Patent
Guo et al.

(10) Patent No.: US 11,792,006 B2
(45) Date of Patent: Oct. 17, 2023

(54) METHOD AND APPARATUS FOR ELECTING REPRESENTATIVE NODE DEVICE, COMPUTER DEVICE, AND STORAGE MEDIUM

(71) Applicant: Tencent Technology (Shenzhen) Company Limited, Shenzhen (CN)

(72) Inventors: Rui Guo, Shenzhen (CN); Maocai Li, Shenzhen (CN); Zongyou Wang, Shenzhen (CN); Haitao Tu, Shenzhen (CN); Li Kong, Shenzhen (CN); Kaiban Zhou, Shenzhen (CN); Changqing Yang, Shenzhen (CN); Nan Wang, Shenzhen (CN); Yong Ding, Shenzhen (CN); Yifang Shi, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 527 days.

(21) Appl. No.: 17/061,383

(22) Filed: Oct. 1, 2020

(65) Prior Publication Data
US 2021/0021419 A1      Jan. 21, 2021

Related U.S. Application Data

(63) Continuation of application No. PCT/CN2019/104141, filed on Sep. 3, 2019.

(30) Foreign Application Priority Data

Sep. 7, 2018 (CN) .................. 201811046267.9

(51) Int. Cl.
*H04L 9/32* (2006.01)
*H04L 9/08* (2006.01)
*H04L 9/00* (2022.01)

(52) U.S. Cl.
CPC .............. *H04L 9/32* (2013.01); *H04L 9/0894* (2013.01); *H04L 9/50* (2022.05); *H04L 2209/463* (2013.01)

(58) Field of Classification Search
CPC ................................ H04L 9/32; H04L 9/0894
(Continued)

(56) References Cited

U.S. PATENT DOCUMENTS

2017/0323392 A1* 11/2017 Kasper ................. H04L 63/123
2017/0344987 A1* 11/2017 Davis .................... H04L 9/3247
(Continued)

FOREIGN PATENT DOCUMENTS

| CN | 106228446 A | 12/2016 |
| CN | 106603698 A | 4/2017 |

(Continued)

OTHER PUBLICATIONS

Li et al, "Proof of Vote: A High-Performance Consensus Protocol Based on Vote Mechanism & Consortium Blockchain," 2017 IEEE 19th International Conference on High Performance Computing and Communications; Bangkok, Thailand, 2017, pp. 466-473 (Year: 2017).*

(Continued)

*Primary Examiner* — Kambiz Zand
*Assistant Examiner* — Phuc Pham
(74) *Attorney, Agent, or Firm* — Morgan, Lewis & Bockius LLP

(57) ABSTRACT

A method for electing a representative node device is performed at a blockchain system, including: obtaining voting transaction data from the node devices, the voting transaction data being used for voting for one or more node devices of the blockchain system as representative node devices; generating and storing the voting transaction data into a target blockchain of the blockchain system when a (Continued)

plurality of node devices of the blockchain system verify the voting transaction data by consensus; and when a quantity of blocks in the target blockchain generated using the voting transaction data reaches a preset quantity, determining an election result according to quantities of votes of the node devices determined from the voting transaction data, the election result identifying a plurality of representative node devices in the blockchain system being configured to generate new blocks for the target blockchain and perform verification on the new blocks by consensus.

20 Claims, 3 Drawing Sheets

(58) Field of Classification Search
USPC .......................................................... 713/168
See application file for complete search history.

(56) References Cited

U.S. PATENT DOCUMENTS

| | | | |
|---|---|---|---|
| 2018/0101560 A1* | 4/2018 | Christidis | H04L 9/3236 |
| 2018/0129955 A1* | 5/2018 | Saxena | G06F 21/6245 |
| 2018/0294955 A1* | 10/2018 | Rhie | G06F 16/27 |
| 2019/0182042 A1* | 6/2019 | Ebrahimi | H04L 9/0894 |
| 2020/0151282 A1* | 5/2020 | Paulsen | G06Q 30/0242 |

FOREIGN PATENT DOCUMENTS

| | | |
|---|---|---|
| CN | 106850536 A | 6/2017 |
| CN | 106878071 A | 6/2017 |
| CN | 106920167 A | 7/2017 |
| CN | 107341660 A | 11/2017 |
| CN | 107423962 A | 12/2017 |
| CN | 108134706 A | 6/2018 |
| CN | 108241968 A | 7/2018 |
| CN | 109165945 A | 1/2019 |
| KR | 101837169 B1 | 3/2018 |
| KR | 101877850 B1 | 7/2018 |
| WO | WO 2018149505 A1 | 8/2018 |

OTHER PUBLICATIONS

Boohyung Lee et al., "Consensus Algorithms in Blockchain Platforms", Jan. 2017, 2 pgs., Retrieved from the Internet: https://www.dbpia.co.kr/journal/articleDetail?nodeId=NODE07125813.

Georgios Konstantopoulos, "Understanding Blockchain Fundamentals, Part 3: Delegated Proof of Stake (DPoS)", Jun. 11, 2018, 8 pgs., Retrieved from the Internet: https://medium.com/loom-network/understanding-blockchain-fundamentals-part-3-delegated-proof-of-stake-b385a6b92ef.

Extended European Search Report, EP19857475.8, dated Sep. 22, 2021, 8 pgs.

Kejiao Li et al., "Proof of Vote: A High-Performance Consensus Protocol Based on Vote Mechanism & Consortium Blockchain", 2017 IEEE 19th International Conference on High Performance Computing and Communications; IEEE 15th International Conference on Smart City; IEEE 3rd International Conference on Data Science and Systems, Dec. 18, 2017, XP033321758, pp. 8.

Tencent Technology, ISR, PCT/CN2019/104141, dated Dec. 3, 2019, 3 pgs.

Tencent Technology, WO, PCT/CN2019/104141, dated Dec. 3, 2019, 6 pgs.

Tencent Technology, IPRP, PCT/CN2019/104141, dated Mar. 9, 2021, 7 pgs.

* cited by examiner

METHOD AND APPARATUS FOR ELECTING REPRESENTATIVE NODE DEVICE, COMPUTER DEVICE, AND STORAGE MEDIUM

CROSS REFERENCE TO RELATED APPLICATIONS

This application is a continuation application of PCT Patent Application No. PCT/CN2019/104141, entitled "METHOD, DEVICE, COMPUTER APPARATUS AND STORAGE MEDIUM FOR ELECTING REPRESENTATIVE NODE APPARATUS" filed on Sep. 3, 2019, which claims priority to Chinese Patent Application No. 201811046267.9, entitled "METHOD AND APPARATUS FOR ELECTING REPRESENTATIVE NODE DEVICE, COMPUTER DEVICE, AND STORAGE MEDIUM" filed on Sep. 7, 2018, all of which are incorporated by reference in their entirety.

FIELD OF THE TECHNOLOGY

This application relates to the field of blockchain technologies, and in particular, to a method and an apparatus for electing a representative node device, a computer device, and a storage medium.

BACKGROUND OF THE DISCLOSURE

In recent years, the value of bitcoin has been increasing year by year. As underlying technologies of bitcoin, blockchain technologies have been widely studied and applied with the appreciation of bitcoin. A blockchain system may include a plurality of node devices. Each node device may store transaction data by using blocks and combine the blocks by sequentially connecting the blocks in chronological order into a chain data structure, to form a distributed ledger in the blockchain system.

At present, node devices may generate a block through the following process: When a transaction occurs on any node device, the node device may record transaction data and broadcast the transaction data in a blockchain system, so that node devices in the blockchain system receive the transaction data. After the node devices in the blockchain system receive the transaction data, the node devices may package the transaction data to generate a new block, and perform verification on the new block by using a consensus mechanism. After the new block is verified, each node device may add the new block to a target blockchain configured on the node devices.

In the foregoing process in which the node devices generate a block, each node device in the blockchain system needs to generate a new block. In a case that a quantity of the node devices in the blockchain system is relatively large, working efficiency of the blockchain system is relatively low. Therefore, a representative node device is needed to take place of all node devices for generating a block, to improve working efficiency of the blockchain system.

SUMMARY

A method and an apparatus for electing a representative node device, a computer device, and a storage medium are provided in embodiments of this application.

A method for electing a representative node device is performed by a blockchain system including multiple node devices, each node device having a processor and memory storing computer-readable instructions to be executed by the node device, and the method includes:
  obtaining voting transaction data from the node devices, the voting transaction data being used for voting for one or more node devices of the blockchain system as representative node devices;
  generating and storing the voting transaction data into a target blockchain of the blockchain system when a plurality of node devices of the blockchain system verify the voting transaction data by consensus; and
  when a quantity of blocks in the target blockchain generated using the voting transaction data reaches a preset quantity, determining an election result according to quantities of votes of the node devices determined from the voting transaction data, the election result identifying a plurality of representative node devices in the blockchain system being configured to generate new blocks for the target blockchain and perform verification on the new blocks by consensus A blockchain system is provided, the blockchain system having multiple node devices, each node device having a processor and memory, the memory storing computer-readable instructions that, when executed by the processor, causing the blockchain system to perform the aforementioned method for electing a representative node device for the blockchain system.

A transitory computer-readable storage medium stores computer-readable instructions that, when executed by one or more processors of node devices of a blockchain system, causing the blockchain system to perform the aforementioned method for electing a representative node device for the blockchain system.

Details of one or more embodiments of this application are provided in the accompanying drawings and descriptions below. Other features, objectives, and advantages of this application will become apparent from the specification, the accompanying drawings, and the claims.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings from the accompanying drawings without creative efforts.

DESCRIPTION OF EMBODIMENTS

To make the objectives, technical solutions, and advantages of this application clearer, the following further describes implementations of this application in detail with reference to the accompanying drawings.

Figure 1:
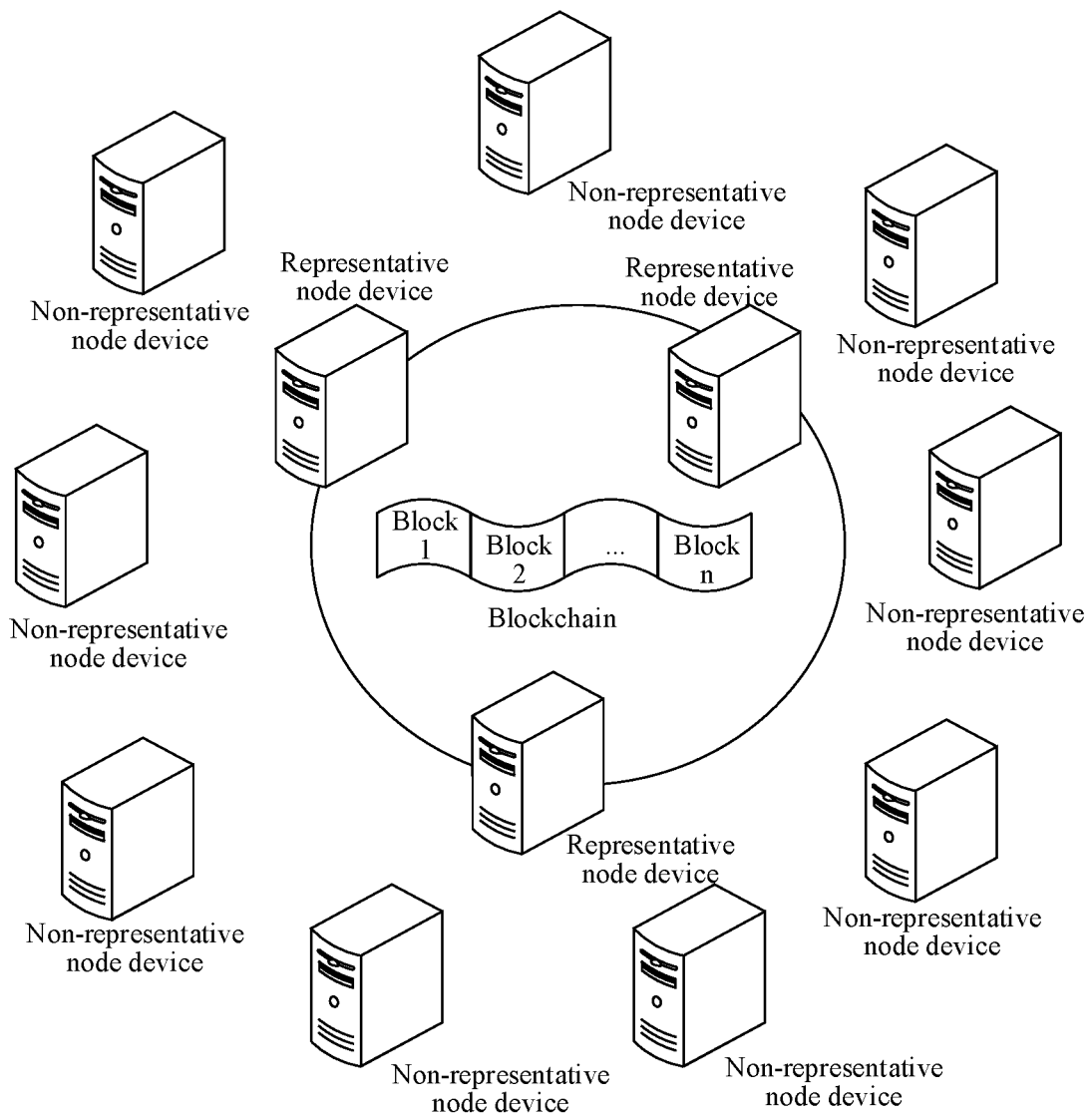
FIG. 1 is a schematic structural diagram of a blockchain system according to an embodiment of this application.

FIG. 1 is a schematic structural diagram of a blockchain system according to an embodiment of this application. Referring to FIG. 1, the system includes a plurality of servers.

The plurality of servers may be equipped with a same blockchain. That is, the plurality of servers may form a blockchain system, and the servers are separately node devices in the blockchain system. The plurality of servers may be a plurality of servers of a same organization, a plurality of servers belonging to different organizations, or a plurality of servers of ordinary users.

As the node devices in the blockchain system, all of the plurality of servers can receive transaction data. However, when the blockchain system records the transaction data, because of different purposes of the node devices, the node devices may be classified into representative node devices and non-representative node devices. A representative node device is configured to generate a block and performing verification on the block by consensus. A non-representative node device is configured to receive the block that is generated by the representative node device and that is verified by the representative node device by consensus, perform verification on the block, and store the verified block on a target blockchain.

For example, in a case that any node device in the blockchain system receives the transaction data, the node device needs to broadcast the received transaction data in the blockchain system, to help another node device receive the transaction data. After the representative node device in the blockchain system receives the transaction data, the representative node device generates a block based on the transaction data, to help all representative node devices perform verification on the block by consensus. After the representative node devices verify the block by consensus, the representative node device broadcasts the block in the blockchain system. After receiving the block broadcast by the representative node device, the non-representative node device performs verification on the block. After being verified, the block is stored on the target blockchain configured on the non-representative node device.

The consensus included in this embodiment of this application means that a plurality of node devices in the blockchain system separately perform verification on data. In a case that verification performed by any node device succeeds, a verification success message is broadcast in the blockchain system. In a case that the verification success message received by any node device meets a preset consensus policy, it is determined that the data is verified by consensus.

For example, descriptions are provided by using an example in which verification by consensus is performed by the representative node devices in the blockchain system. The verification by consensus may be done through the proof of work (POW) mechanism. The process is described as follows: The representative node device in the blockchain system generates a block. The representative node device calculates a hash value of a block header of the generated block and determines whether the hash value is less than a current target value. In a case that the hash value is greater than the target value, the representative node device changes a random number in the generated block and recalculates the hash value. In a case that the hash value calculated by the representative node device is less than the target value, the representative node device broadcasts the block to other representative node devices or in the blockchain system. Other representative node devices perform verification the block after receiving the block. In a case that most of the other representative node devices all agree with validity of the block, the block is verified by consensus.

In the system provided in the embodiments of this application, it is unnecessary to check whether transaction data can be stored after all node devices in the blockchain system generate a block and most of the node devices in the blockchain system achieve a consensus on the generated block. Only if the representative node device generates a block and performs verification on the block by consensus, and the non-representative node device completes verification, transaction data can be recorded in the blockchain system, thereby improving working efficiency of the blockchain system.

Therefore, with regard to a generation process of a representative node device in the blockchain system, descriptions are provided below by using a specific embodiment.

Figure 2:
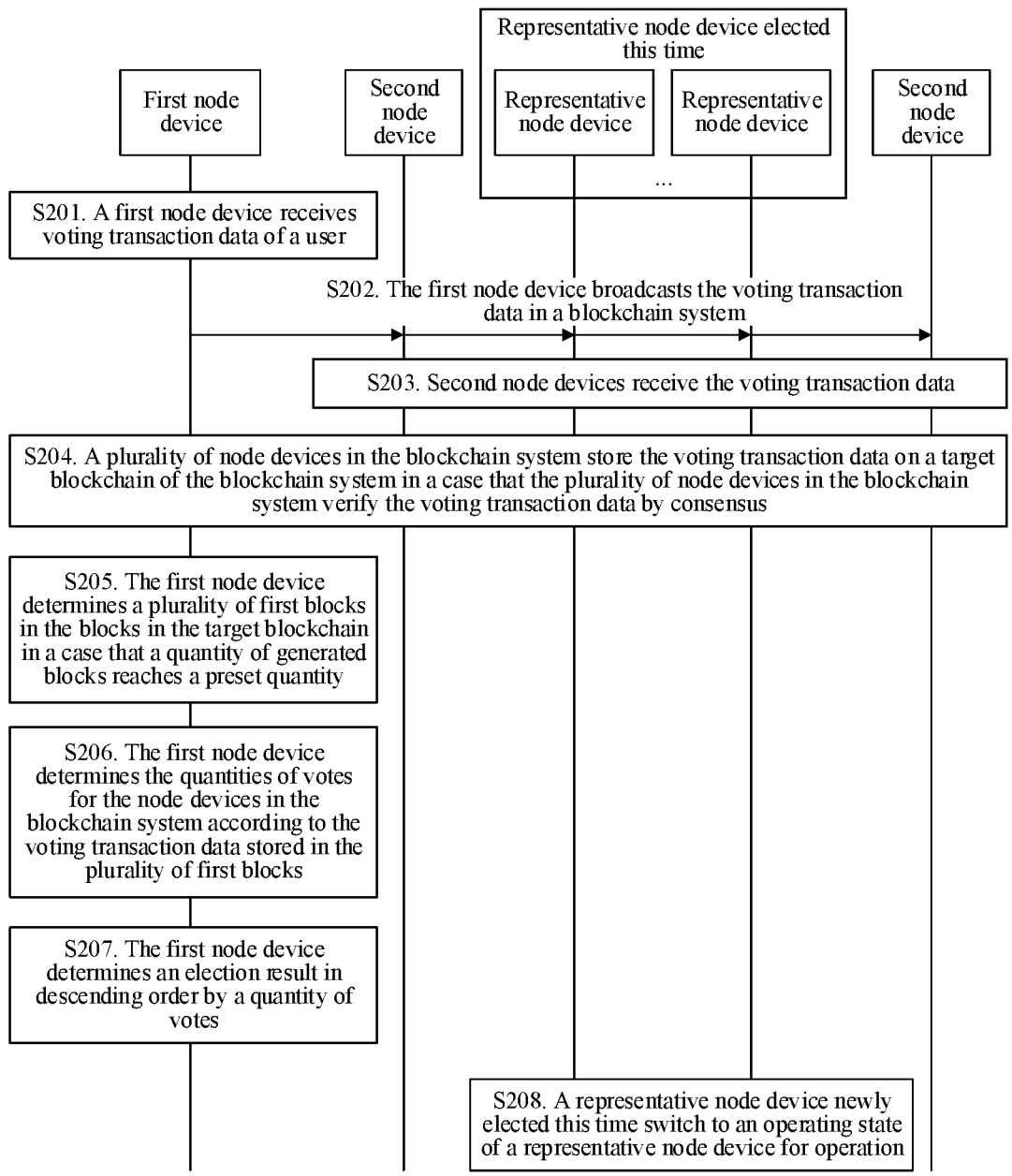
FIG. 2 is a flowchart of a method for electing a representative node device according to an embodiment of this application.

FIG. 2 is a flowchart of a method for electing a representative node device according to an embodiment of this application. Referring to FIG. 2, a process of the method according to this embodiment of this application includes the following steps.

S201. A first node device receives voting transaction data of a user.

The first node device in a blockchain system is any node device in the blockchain system. A type of a transaction initiated by user equipment to the first node device may include a voting transaction and another transaction.

The voting transaction data is a type of transaction data, and may be generated based on a voting target of a user in the blockchain system. In a case that any user on a node device of the blockchain system initiates a vote, the node device obtains voting transaction data, and the voting transaction data may include: a transaction type, a list of node devices that are voted for, a private key signature of a voting user, and the like.

In this embodiment of this application, an example in which a user initiates a voting transaction to the first node device by using user equipment is used. The blockchain system performs initialization and determines an initial representative node device. The initial representative node device is a node device configured to generate a block and perform verification on the block by consensus in the blockchain system in a case that no election is performed. In the initialization stage, a public key of the initial representative node device may be stored in a genesis block of a blockchain, so that all node devices in the blockchain system know the public key of the initial representative node device, the public key being used for indicating an identity of the initial representative node device. In an embodiment, in a case of being needed by a consensus algorithm, in the initialization stage, a network protocol address of the initial representative node device may also be stored in the genesis block, so that all of the node devices in the blockchain system know the network protocol address of the initial representative node device.

That is the public key is used for indicating the identity of the initial representative node device means that in a first election process, the initial representative node device in the blockchain may learn of its identity as the representative node device from the public key of the initial representative node device stored in the genesis block. The initial representative node device operates in a representative node device state. Similarly, a non-representative node device may also learn of its identity as a non-representative node device from the public key, and then the non-representative node device operates in a non-representative node device state.

S202. The first node device broadcasts the voting transaction data in the blockchain system.

The broadcasting may enable all of the node devices in the blockchain system to receive the voting transaction data. In this embodiment of this application, descriptions are provided by using an example in which the first node device directly receives the voting transaction data generated by the user logging in to the first node device for voting. However, in an embodiment, the first node device may directly receive the voting transaction data broadcast by another node device after the user logs in to the another node device for voting. This is not specifically limited in this embodiment of this application.

S203. Second node devices receive the voting transaction data.

The second node devices are node devices in the blockchain system other than the first node device. None of the attributes, such as "first" and "second", included in the embodiments of this application is used for differentiating functions of the node devices, and instead, the attributes are only used for differentiating different node devices.

S204. A plurality of node devices in the blockchain system store the voting transaction data on a target blockchain of the blockchain system in a case that the plurality of node devices in the blockchain system verify the voting transaction data by consensus.

In this embodiment of this application, that the plurality of node devices verify the voting transaction data by consensus may mean that a plurality of representative node devices in the blockchain system verify the voting transaction data by consensus. For a blockchain system that performs an election for a first time, the initial representative node device mentioned above may be used as a node device participating in a consensus process this time. Subsequently, after a plurality of representative node devices are elected, the plurality of representative node devices that are obtained through the election may be switched to a running state of a representative node to participate in a process of consensus and block generation of the entire blockchain system. A node device that is not elected as a representative node device is in a running state of a non-representative node device and does not participate in the process of consensus and block generation of the entire blockchain system. The term "a plurality of" mentioned in this embodiment of this application means "more than one".

S205. The first node device determines a plurality of first blocks in the target blockchain in a case that a quantity of generated blocks reaches a first preset quantity, the plurality of first blocks being configured to store the voting transaction data of the node devices.

In step 205, the first node device may search the blocks of the target blockchain based on a voting transaction type, to obtain a block storing the voting transaction type as the first block.

In this embodiment of this application, a plurality of elections may be performed during an operation process of the blockchain system, to avoid a system operation problem caused by an exception of a specific representative node device, for example, a specific representative node device operating in an abnormal state or having a credit problem and the like, thereby ensuring steady operation of the blockchain system based on the representative node device.

The generated blocks are blocks generated after the previous election. Only when the quantity of the generated blocks reaches the first preset quantity, an election is performed, so that a switching time length of a representative node device, that is, how often a representative node device is switched, may be ensured, thereby avoiding switching the representative node device frequently and avoiding affecting normal operation of the entire blockchain system.

It may be understood that the generated blocks include blocks generated based on voting transaction data, may further include blocks generated based on other transaction data, and certainly, may further include blocks generated based on voting transaction data and other transaction data. Details are not described in this embodiment of this application again.

All the node devices in the blockchain system may execute the process of step S205, and details are not described in this embodiment of this application again.

S206. The first node device determines, according to the voting transaction data stored in the plurality of first blocks, quantities of votes for the node devices in the blockchain system.

The voting transaction data includes a transaction type, a list of node devices that are voted for, a private key signature of a voting user, and the like. Therefore, according to the voting transaction data stored on respective first blocks, a quantity of votes obtained by each node device may be counted.

In this embodiment of this application, there may be two voting manners, namely, incremental voting and full voting, in the blockchain system. The incremental voting refers to indicating a node device that is voted for in a voting transaction and keeping historical voting results. For example, in a case that a user has voted for three node devices A, B and C, and an object of this voting is a node device D, during this voting, the user may directly vote for the node device D. A list of node devices that are voted for in the voting transaction data carries a public device key of the node device D. That is, the user votes for, through a plurality of rounds of voting, the four node devices A, B, C, and D.

Based on the foregoing incremental voting manner, a vote for a node device that is voted for may be withdrawn. For example, a user has already voted for three node devices A, B and C, and if the user wants to withdraw a vote for the node device C next time, the user may directly indicate withdrawal of the vote for the node device C in the voting transaction data during next voting.

The full voting refers to that for each transaction, it is needed to indicate a node device that is voted for and that a previous vote is invalid. For example, in a case that the user has voted for a node device A and a node device B, and next voting objects are a node device C and a node device D, in the next voting, the user not only needs to indicate voting for the node device C and the node device D, but also needs to directly overwrite previous votes for the node device A and the node device B.

In an embodiment, corresponding voting weights may be set for different users, the weight being used for indicating an influence degree on the blockchain system. The weight may be used for determining an influence of a vote cast by a user on the entire election. For example, in a case that a weight of a specific user is 5, the user may vote for 5 node devices, that is, the user has a voting right to cast 5 votes.

In an embodiment, a specific stage in which the weight is set is not limited in this embodiment of this application. For example, the weights may be set when the quantities of votes are counted. Certainly, the weights may alternatively be determined by the first node device when the first node device generates the voting transaction data, and be carried in the voting transaction data.

In an embodiment, the weights may be set based on different parameters. For example, the parameter may be an account balance of a user, that is, a larger account balance indicates a higher weight that is set for the user. In another example, a parameter may alternatively be a credit value of a user, that is, a larger credit value of the user indicates a higher weight that is set for the user.

Further, the specific parameters used for setting may be different according to different application objects of the blockchain system. For example, in a case that the blockchain system is applied to an ordinary service, the weight may be set according to the account balance of the user. In a case that the blockchain system is applied to a bank service, the weight may be set according to the credit value of the user.

In an embodiment, a voting user may also be limited, to prevent the limited voting user from participating in the voting. For example, in a blockchain system, only by an institution or an organization can initiate a voting for the representative node device, and an ordinary user cannot cast a vote.

In an embodiment, the blockchain system may also specify a quantity of votes possessed by each user, that is, how many votes each user can cast at most. In some special embodiments, the user may alternatively specify a quantity of votes or a weight obtained by a voting object, but the quantity of votes cannot exceed a total quantity of votes possessed by the user.

S207. The first node device determines an election result in descending order by a quantity of votes, the election result including a second preset quantity of representative node devices in the blockchain system.

The second preset quantity may be kept consistent with the quantity of current working representative node devices. That is, it can be ensured through setting of the second preset quantity that the current working representative node devices can all be replaced with the elected representative node devices. Certainly, the second preset quantity may alternatively be changed. For example, the second preset quantity may be changed according to the quantity of node devices in the blockchain system, and in a case that the quantity of the node devices is increased, the second preset quantity may be increased.

The first node device may determine whether it is a newly elected representative node device according to the election result determined by itself. That is, any node device in the blockchain system may determine, according to an election result obtained by itself through counting, whether it is a newly elected representative node device, and identities of other representative node devices that are newly elected this time.

Steps S205 to S207 are an implementation of a process of determining, by the first node device according to quantities of votes of the plurality of candidate node devices, a plurality of representative node devices in the blockchain system, that is, a process of determining, according to the voting transaction data stored in the plurality of first blocks, the second preset quantity of representative node devices in the blockchain system. However, in some implementations, the quantities of votes may be counted by in a manner of setting a vote list, to make an election. Detailed descriptions are provided as follows:

Each node device may maintain a vote list, the vote list being used for storing the quantities of votes for the node devices. For the vote list, an update may be performed based on each voting of the blockchain system, or an update may be performed based on the plurality of first blocks on the target blockchain at an interval of a preset time length or in a case that the quantity of generated blocks reaches a preset quantity. This is not limited in this embodiment of this application. Further, during the election, verification may be performed on the vote list by using the transaction data stored on the blockchain system, so that the election may be performed based on the vote list.

Specifically, each time the vote list is updated, according to different voting manner of the blockchain system, an update process may be as follows:

According to the descriptions of the incremental voting in step S207, it may be learned that the incremental voting is a voting manner of performing the incremental voting again based on the original voting. Therefore, in a case that the voting manner in the blockchain system is the incremental voting, the vote list stored on the node devices may be updated according to the voting transaction data of users stored in the first blocks. For example, voting objects of the last but one voting of a user on a first block are three node devices A, B, and C. A voting object of the last voting is a node device D. To obtain all quantities of votes, apart from directly adding a vote for the node device D to the vote list, voting objects of the last but one voting further need to be queried for in the target blockchain. By analogy, voting objects of each time are queried for, and the vote list is updated according to a query result.

According to the descriptions of the full voting in step S207, it may be understood that the full voting is a voting manner of performing the voting based on overwriting a previous voting result. Therefore, in a case that the voting manner in the blockchain system is the full voting, the vote list stored on the node devices may be updated according to the voting transaction data of the last voting of users stored in the first blocks. For example, on a first block, voting objects of the last but one voting of a user are three node devices A, B, and C. The last voting is performed to vote for a node device D, and the previous votes for the three node devices A, B, and C are overwritten. Therefore, a vote may be directly added for the node device D to the vote list during the update of the vote list.

In a case that the quantity of generated blocks in the target blockchain reaches the first preset quantity, the quantities of votes for the node devices on the vote list may be sorted in descending order, to determine the second preset quantity of representative node devices. Further, the voting manner may also be performed in combination with the weights. The detailed combination manner is the same as the foregoing descriptions of the weights, and details are not described herein.

S208. A representative node device newly elected this time switches to an operating state of a representative node device for operation.

After the representative node device newly elected this time obtains a result of this election according to the voting transaction data stored by itself, the representative node device newly elected may learn that it is elected as a representative node device, so that the representative node device newly elected this time switches to the operating state of a representative node device and starts to work.

In the method according to this embodiment of this application, representative node devices are elected in a blockchain system by voting for node devices in the blockchain system. The representative node devices take place of all node devices in the blockchain system to generate new blocks for the target blockchain and perform verification on the new blocks by consensus and the like, to prevent the node devices from all performing the foregoing process, thereby greatly improving working efficiency of the blockchain system.

Further, in the election process, the election manner may be the incremental voting or the full voting. Based on different voting manners or weights set for users, different vote counting methods may be selected, to provide a more flexible election manner for the election of the representative node devices in the blockchain system. Quantities of votes for the node devices in the blockchain system are counted and sorted in descending order at an interval of generating a first preset quantity of blocks, to elect the representative node devices. The manner can further control a switching time length of the representative node devices, thereby avoiding frequent switching of the representative node devices and avoid that the blockchain system cannot work normally. In addition, the blockchain system performs a plurality of elections, to prevent some representative node devices that cannot work normally from being switched, to maintain normal operation of the blockchain system.

Figure 3:
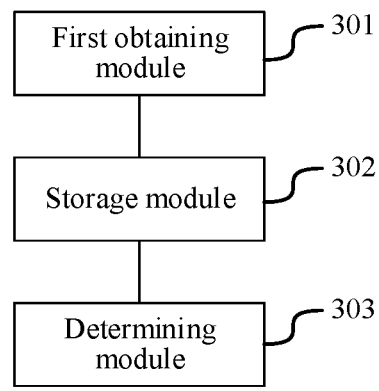
FIG. 3 is a schematic structural diagram of an apparatus for electing a representative node device according to an embodiment of this application.

FIG. 3 is a schematic structural diagram of an apparatus for electing a representative node device according to an embodiment of this application. Referring to FIG. 3, the apparatus includes a first obtaining module 301, a storage module 302, and a determining module 303.

The first obtaining module 301 is connected to the storage module 302, and is configured to obtain voting transaction data, the voting transaction data being used for voting for at least one node device in a blockchain system.

The storage module 302 is connected to the determining module 303, and is configured to store the voting transaction data on a target blockchain in the blockchain system in a case that a plurality of node devices in the blockchain system verify the voting transaction data by consensus.

The determining module 303 is configured to determine, in a case that a quantity of generated blocks reaches a preset quantity, an election result according to quantities of votes of the plurality of node devices, the election result including a plurality of representative node devices in the blockchain system, the representative node devices being configured to generate new blocks for the target blockchain and perform verification on the new blocks by consensus.

In an embodiment, the determining module 303 includes:
a block determining unit, configured to determine a plurality of first blocks from the blocks of the target blockchain, the plurality of first blocks being configured to store the voting transaction data of the node devices; and
a representative node device determining unit, configured to determine a preset quantity of representative node devices in the blockchain system according to the voting transaction data stored in the plurality of first blocks.

In an embodiment, the representative node device determining unit includes:
a quantity-of-votes determining subunit, configured to determine the quantities of votes for the node devices in the blockchain system according to the voting transaction data stored in the plurality of first blocks; and
a representative node device determining subunit, configured to determine the preset quantity of representative node devices in the blockchain system in descending order by a quantity of votes.

In an embodiment, a voting manner in the blockchain system is incremental voting, and the quantity-of-votes determining subunit is further configured to determine the quantities of votes for the node devices in the blockchain system according to transaction data of users stored in the plurality of first blocks.

In an embodiment, a voting manner in the blockchain system is full voting, and the quantity-of-votes determining subunit is configured to determine transaction data of the last voting of users from the transaction data stored in the plurality of first blocks, and determine the quantities of votes for the node devices in the blockchain system based on the transaction data of the last voting of the users.

In an embodiment, a weight is set for a vote of each user participating in the voting.

In an embodiment, the weight of the each user is set based on a user parameter, the user parameter including an account balance or a credit value.

In an embodiment, the apparatus further includes:
an update module, configured to update, in a case that the plurality of node devices in the blockchain system verify the voting transaction data by consensus, a vote list stored on the node devices according to the voting transaction data, the vote list being used for storing the quantities of votes for the node devices.

In an embodiment, in a case that a voting manner in the blockchain system is full voting, the update module is further configured to determine transaction data of the last voting of users from the transaction data stored in the first blocks, and updating the vote list stored on the node devices based on the transaction data of the last voting of the users.

In an embodiment, in a case that a voting manner in the blockchain system is incremental voting, the update module is further configured to update the vote list stored on the node devices according to all pieces of voting transaction data of users stored in first blocks.

In the apparatus according to the embodiments of this application, representative node devices in a blockchain system are elected in a voting manner. The representative node devices can take place of all node devices in the blockchain system to generate a block, and may complete verification on a new block by consensus, thereby improving working efficiency of the blockchain system.

All the foregoing optional technical solutions may be arbitrarily combined to form an optional embodiment of this application, and details are not described herein.

When the apparatus for electing a representative node device provided in the foregoing embodiments performs an election, merely divisions of the foregoing functional modules are used as an example for description. During actual application, the foregoing functions may be allocated to and completed by different functional modules according to requirements, that is, the internal structure of the apparatus is divided into different functional modules, to complete all or some of the foregoing described functions. In addition, the method for electing a representative node device and embodiments provided in the foregoing embodiments belong to one conception. For the specific implementation process, reference may be made to the method embodiments, and details are not described herein again.

Figure 4:
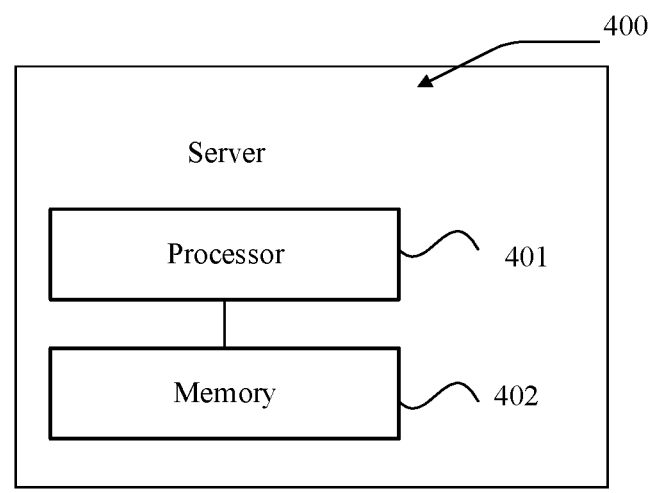
FIG. 4 is a schematic structural diagram of a server according to an embodiment of this application.

FIG. 4 is a schematic structural diagram of a server according to an embodiment of this application. The server 400 may vary greatly due to different configurations or performance, and may include one or more processors (for example, central processing units, CPU) 401 and one or more memories 402. The memories 402 store computer-readable instructions. The computer-readable instructions are loaded and executed by the processors 401 to implement the method provided in the foregoing method embodiments. Certainly, the server may further include components such as a wired or wireless network interface, a keyboard, and an input/output interface, to facilitate inputs/outputs. The server may further include another component configured to implement functions of a device, and details are not described herein again.

In an exemplary embodiment, a computer-readable storage medium, such as a memory including an instruction, is further provided, and the instruction may be executed by a processor in a terminal to complete the method for electing a representative node device in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for electing a representative node device, performed by a blockchain system including multiple node devices, each node device having a processor and memory storing computer-readable instructions to be executed by the node device, the method comprising:
    obtaining voting transaction data from the multiple node devices, the voting transaction data being used for voting for one or more node devices of the blockchain system as representative node devices;
    generating and storing the voting transaction data into a target blockchain of the blockchain system when a plurality of the multiple node devices of the blockchain system verify the voting transaction data by consensus;
    in accordance with a quantity of blocks in the target blockchain generated using the voting transaction data being at least a preset quantity, determining an election result according to quantities of votes of the multiple node devices determined from the voting transaction data, the election result identifying a subset of node devices from the multiple node devices in the blockchain system; and
    setting an operating state of the subset of node devices to be representative node devices, the representative node devices being configured to generate new blocks for the target blockchain and perform verification on the new blocks by consensus.

2. The method according to claim 1, wherein the determining an election result according to quantities of votes of the multiple node devices determined from the voting transaction data comprises:
    determining a plurality of first blocks in the target blockchain, the plurality of first blocks being configured to store the voting transaction data of the multiple node devices; and
    determining a preset quantity of representative node devices in the blockchain system according to the voting transaction data stored in the plurality of first blocks.

3. The method according to claim 2, wherein the determining a preset quantity of representative node devices in the blockchain system according to the voting transaction data stored in the plurality of first blocks comprises:
    determining quantities of votes for node devices in the blockchain system according to the voting transaction data stored in the plurality of first blocks; and
    determining the preset quantity of representative node devices in the blockchain system in a descending order by quantity of votes.

4. The method according to claim 3, wherein a voting manner in the blockchain system is incremental voting, and the determining the quantities of votes for the node devices in the blockchain system according to the voting transaction data stored in the plurality of first blocks comprises:
    determining the quantities of votes for the node devices in the blockchain system according to transaction data of users stored in the plurality of first blocks.

5. The method according to claim 3, wherein a voting manner in the blockchain system is full voting, and the determining the quantities of votes for the node devices in the blockchain system according to the voting transaction data stored in the plurality of first blocks comprises:
    determining transaction data of the last voting of users from the transaction data stored in the plurality of first blocks, and determining the quantities of votes for the node devices in the blockchain system based on the transaction data of the last voting of the users.

6. The method according to claim 1, wherein a weight is assigned to a vote of each user participating in the voting.

7. The method according to claim 6, wherein the weight of the each user is set based on a user parameter, the user parameter comprising an account balance or a credit value.

8. The method according to claim 1, further comprising:
    when the plurality of the multiple node devices in the blockchain system verify the voting transaction data by consensus, updating a vote list stored on the blockchain system according to the voting transaction data, the vote list being used for storing quantities of votes for node devices.

9. The method according to claim 8, wherein, when a voting manner in the blockchain system is full voting, the updating a vote list stored on the blockchain system comprises:
    determining transaction data of the last voting of users from the transaction data stored in first blocks, and updating the vote list stored on the blockchain system based on the transaction data of the last voting of the users.

10. The method according to claim 8, wherein, when a voting manner in the blockchain system is incremental voting, the updating a vote list stored on the blockchain system comprises:
    updating the vote list stored on the blockchain system according to all pieces of voting transaction data of users stored in first blocks.

11. A blockchain system comprising multiple node devices, each node device having a processor and memory, the memory storing computer-readable instructions that, when executed by the processor, causing the blockchain system to perform a plurality of operations including:
    obtaining voting transaction data from the multiple node devices, the voting transaction data being used for voting for one or more node devices of the blockchain system as representative node devices;
    generating and storing the voting transaction data into a target blockchain of the blockchain system when a plurality of the multiple node devices of the blockchain system verify the voting transaction data by consensus;

in accordance with a quantity of blocks in the target blockchain generated using the voting transaction data being at least a preset quantity, determining an election result according to quantities of votes of the multiple node devices determined from the voting transaction data, the election result identifying a subset of node devices from the multiple node devices in the blockchain system; and setting an operating state of the subset of node devices to be representative node devices, the representative node devices being configured to generate new blocks for the target blockchain and perform verification on the new blocks by consensus.

12. The blockchain system according to claim 11, wherein the determining an election result according to quantities of votes of the multiple node devices determined from the voting transaction data comprises:

determining a plurality of first blocks in the target blockchain, the plurality of first blocks being configured to store the voting transaction data of the multiple node devices; and determining a preset quantity of representative node devices in the blockchain system according to the voting transaction data stored in the plurality of first blocks.

13. The blockchain system according to claim 12, wherein the determining a preset quantity of representative node devices in the blockchain system according to the voting transaction data stored in the plurality of first blocks comprises:

determining quantities of votes for node devices in the blockchain system according to the voting transaction data stored in the plurality of first blocks; and determining the preset quantity of representative node devices in the blockchain system in a descending order by quantity of votes.

14. The blockchain system according to claim 13, wherein a voting manner in the blockchain system is incremental voting, and the determining the quantities of votes for the node devices in the blockchain system according to the voting transaction data stored in the plurality of first blocks comprises:

determining the quantities of votes for the node devices in the blockchain system according to transaction data of users stored in the plurality of first blocks.

15. The blockchain system according to claim 13, wherein a voting manner in the blockchain system is full voting, and the determining the quantities of votes for the node devices in the blockchain system according to the voting transaction data stored in the plurality of first blocks comprises:

determining transaction data of the last voting of users from the transaction data stored in the plurality of first blocks, and determining the quantities of votes for the node devices in the blockchain system based on the transaction data of the last voting of the users.

16. The blockchain system according to claim 11, wherein the plurality of operations further comprise:

when the plurality of the multiple node devices in the blockchain system verify the voting transaction data by consensus, updating a vote list stored on the blockchain system according to the voting transaction data, the vote list being used for storing quantities of votes for node devices.

17. The blockchain system according to claim 16, wherein, when a voting manner in the blockchain system is full voting, the updating a vote list stored on the blockchain system comprises:

determining transaction data of the last voting of users from the transaction data stored in first blocks, and updating the vote list stored on the blockchain system based on the transaction data of the last voting of the users.

18. The blockchain system according to claim 16, wherein, when a voting manner in the blockchain system is incremental voting, the updating a vote list stored on the blockchain system comprises:

updating the vote list stored on the blockchain system according to all pieces of voting transaction data of users stored in first blocks.

19. A non-transitory computer-readable storage medium, storing computer-readable instructions that, when executed by one or more processors of multiple node devices of a blockchain system, causing the blockchain system to perform a plurality of operations including:

obtaining voting transaction data from the multiple node devices, the voting transaction data being used for voting for one or more node devices of the blockchain system as representative node devices;

generating and storing the voting transaction data into a target blockchain of the blockchain system when a plurality of the multiple node devices of the blockchain system verify the voting transaction data by consensus;

in accordance with a quantity of blocks in the target blockchain generated using the voting transaction data being at least a preset quantity, determining an election result according to quantities of votes of the multiple node devices determined from the voting transaction data, the election result identifying a subset of node devices from the multiple node devices in the blockchain system; and setting an operating state of the subset of node devices to be representative node devices, the representative node devices being configured to generate new blocks for the target blockchain and perform verification on the new blocks by consensus.

20. The non-transitory computer-readable storage medium according to claim 19, wherein the plurality of operations further comprise:

when the plurality of the multiple node devices in the blockchain system verify the voting transaction data by consensus, updating a vote list stored on the blockchain system according to the voting transaction data, the vote list being used for storing quantities of votes for node devices.

* * * * *